United States Patent

[11] 3,599,289

| [72] | Inventor | Umberto Girola<br>Via Monte Ceneri 60, Milan, Italy |
|------|----------|------|
| [21] | Appl. No. | 862,876 |
| [22] | Filed | Oct. 1, 1969 |
| [45] | Patented | Aug. 17, 1971 |
| [32] | Priority | Oct. 2, 1968 |
| [33] | | Germany |
| [31] | | P 18 01 394.0 |

[54] MOLD-CLOSING APPARATUS FOR MOLDING MACHINE
14 Claims, 7 Drawing Figs.

| [52] | U.S. Cl. | 18/30 LA |
| [51] | Int. Cl. | B29f 1/00 |
| [50] | Field of Search | 18/30 LA, 30 LM, 30 LV |

[56] References Cited
UNITED STATES PATENTS

| 2,718,662 | 9/1955 | Bohannon et al. | 18/30 LV |
| 3,263,277 | 8/1966 | Ohlendorf et al. | 18/30 LV |
| 3,449,795 | 6/1969 | Fischbach | 18/30 LA |

FOREIGN PATENTS

| Des. 1,132,713 | 7/1962 | Germany | 18/30 LA |

*Primary Examiner*—J. Howard Flint, Jr.
*Attorney*—Karl F. Ross

ABSTRACT: A fixed mold-supporting plate and a fixed backstop plate, spacedly mounted on the bed of a molding machine, are interconnected by tie bars on which a movable mold-supporting plate and a holding plate are slidably mounted, with the holding plate disposed between the backstop and movable mold-supporting plates. The backstop plate forms a fluid chamber receiving a piston which also rides the tie bars and is axially slidable thereon, relatively to the backstop plate, over a distance of a few millimeters. As the complementary mold portions on the two mold-supporting plates are being brought together by hydraulic or pneumatic displacement of the movable mold-supporting plate, a drive motor on the holding plate rotates a screw extending axially therethrough or a nut carried on that screw to provide a brace substantially spanning the gap between the mold and the backstop plate whereupon pressure in the fluid chamber of the latter plate generates a supplemental thrust to hold the mold closed.

Umberto Girola
*Inventor.*

By
*Karl J. Ross*
Attorney

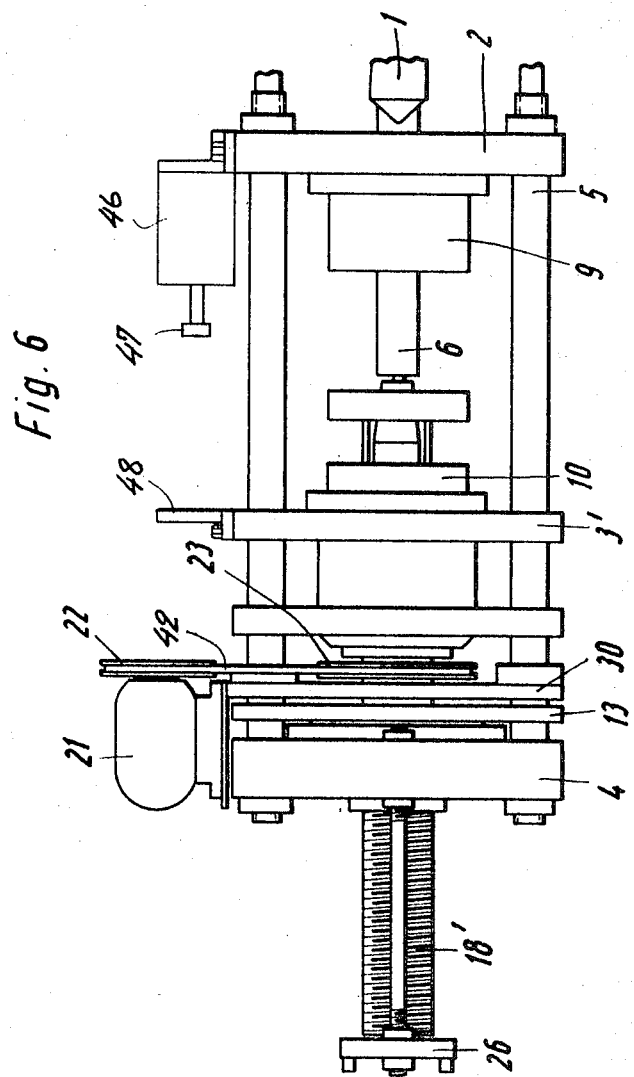

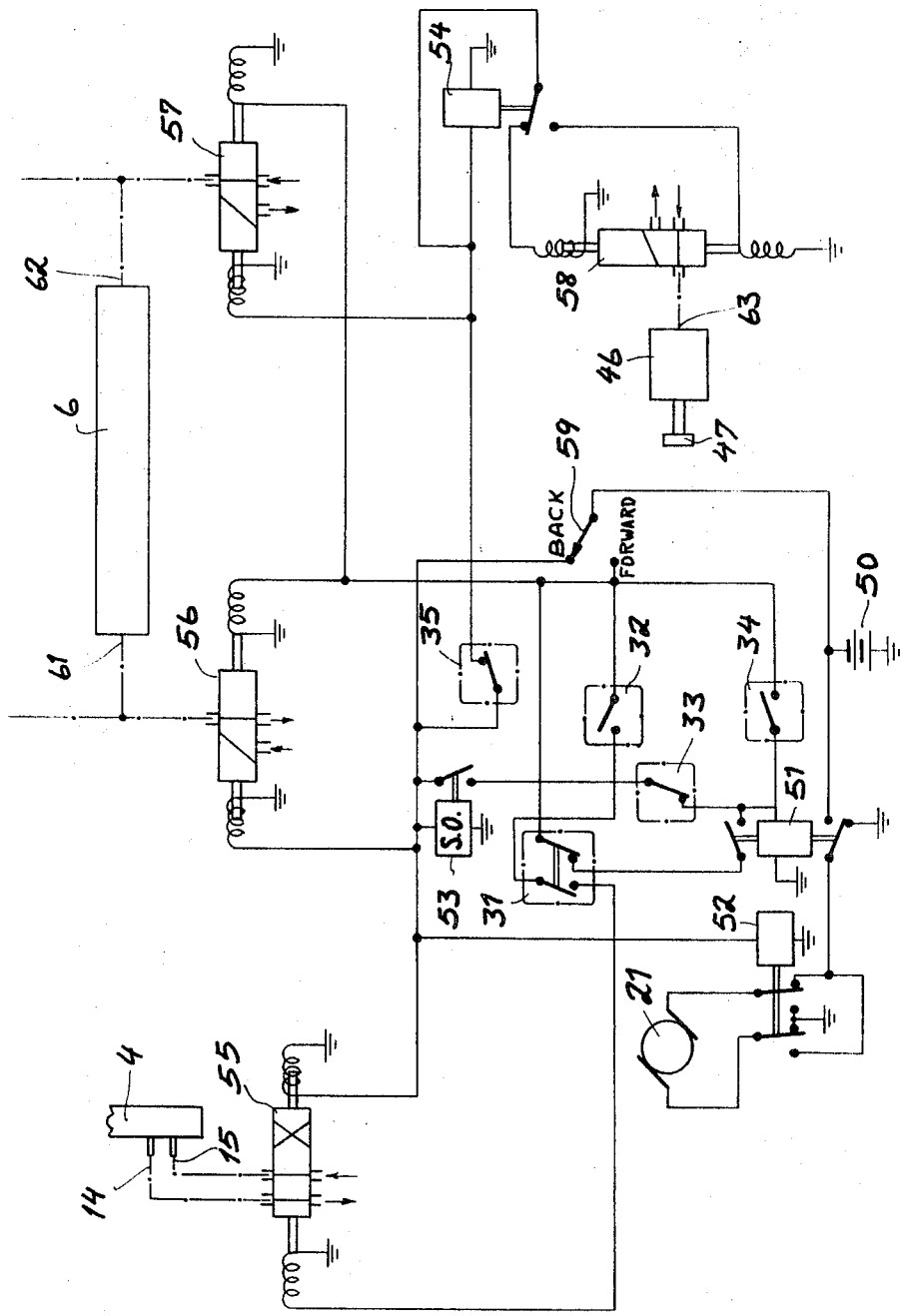

MOLD-CLOSING APPARATUS FOR MOLDING MACHINE

My present invention relates to mold-closing apparatus to be used with molding machines of the injection or the compression type having a split mold.

It is customary in such machines to mount one of two (or more) separable mold portions, often referred to as mold halves, on a supporting plate fixed to the machine bed and to secure a cooperating mold portion to a movable supporting plate slidably mounted on elongated guide means, such as a set of tie bars, extending in the direction of the mold axis. Hydraulic or, in some instances, pneumatic fluid pressure may be used to reciprocate the movable mold support in timed relationship with the introduction of plastic material into the cavity or cavities defined by the several mold portions in the position of mold closure. With injection-molding machines, this plastic material is generally admitted into each cavity through an orifice in the stationary mold portion.

The opening and closing of the mold should be performed as rapidly as possible and, also, must be controlled in such a way as to avoid major impacts at the end of each stroke; this calls for a relatively lightweight and low-power reciprocating mechanism with a small moment of inertia. On the other hand, substantial forces are needed to hold the mold closed during the shaping operation, in view of the high pressures developing within the mold. Thus, it is desirable to apply to the mold an additional clamping force supplementing, in its closed position, the relatively low fluid pressure used to bring the movable mold portion into contact with the fixed mold portion.

The principal object of my present invention is to provide an improved mold-closing apparatus in which this supplemental clamping force is generated by simple means.

In some prior-art molding machines the additional clamping force is provided by two threadedly interconnected elements, such as a screw and a nut, whose relative rotation forces the movable mold portion against the fixed mold portion in the final phase of the mold-closing stroke. This requires the transmission of the clamping pressure through journal bearings supporting the rotatable element and, furthermore, makes it necessary to rotate this element under axial stress, thus against considerable frictional resistance.

A more specific object, therefore, is to provide a system wherein the supplemental clamping force applied to the closed mold is not transmitted through any journal bearing having limited resistance to axial stresses.

A further object of my invention is to provide a construction for the purpose described which does not require a relative rotation of threadedly interconnected elements under pressure.

In accordance with my present invention, I provide on the machine bed a fixed backstop member remote from but in line with the fixed mold support, the movable member constituting the second mold support being advantageously slidable on tie bars secured at one end to the fixed mold support and at the other end to the backstop member. Between the two members referred to, i.e. the backstop member supporting the movable mold portion, I provide axially extensible bracing means in series with fluid-actuatable thrust means, the bracing means having a motor independent of the drive means for the reciprocation of the movable mold portion, but operable substantially concurrently therewith, for extending and contracting the bracing means in step with the closing and the opening of the mold, respectively, so that the gap between the two members is spanned by the bracing means in the position of mold closure; actuation of the thrust means interposed between the bracing means and one of these members, preferably the backstop member, then imparts additional axial pressure to the movable mold support to clamp the mold shut during the formation of the article or articles to be molded therein.

Pursuant to a more specific feature of my invention, I utilize two relatively rotatable threaded element—i.e. a screw and a nut—as the bracing means, with the nut preferably bearing upon or being integral with a piston forming part of the thrust means. Thus, according to a preferred embodiment, the backstop member is formed with a fluid chamber receiving the aforementioned piston with limited axial mobility, the introduction of high-pressure fluid into this chamber exerting a clamping force upon the movable mold-supporting member through the screw spanning the aforementioned gap. This transmission of force takes place while the screw and the nut are relatively stationary, having reached the terminal position of their extension stroke. If the screw is rotatable, the nut may be made in one piece with the thrust piston; if the nut is rotatable, the screw may be integral with the movable mold-supporting member. In either case, the rotatable element is advantageously journaled in a slidable holder disposed between the backstop member and the movable mold support, this holder also carrying the drive motor for that element.

Pursuant to a further feature of my invention, the relative spacing between the holder and the member confronted by it in the brace-extending position is used to actuate a switch for deactivating the motor as soon as the screw or the nut closely approaches the member from which it is normally separated, i.e. to within a distance equal to a small fraction of the stroke length of the movable mold support. This distance, e.g. of less than 2 mm., is subsequently taken up by the actuation of the hydraulic or pneumatic thrust means. Thus, the spindle or the nut never rotates under axial pressure as long as the start of the screw drive is so timed in relation to the operating speed of its drive motor that the gap will not be spanned until the mold has arrived in its closure position. Conversely, contraction of the bracing means by reverse rotation of the screw or the nut should start before the reopening of the mold and at a speed sufficient to prevent the bounds of the narrowing gap from overtaking the receding screw or nut. For the latter purpose it is particularly advantageous to delay the start of the mold drive on the opening stroke until the holder carrying the rotatable bracing element has substantially returned to its retracted position, yet the release of the molded article or articles may be expedited in that case by fluid-operated pressure means of limited stroke length acting upon partial contraction of the bracing means to separate the previously clamped mold portions.

The above and other features of my invention will be described hereinafter in greater detail with reference to the accompanying drawing in which:

FIGS. 4, 5 and 6 are views similar to FIGS. 1, 2 and 3, respectively, illustrating another embodiment; and FIG. 7 is a diagram of the electrical and hydraulic circuits forming part of the system of FIGS. 1—2.

Figure 1:
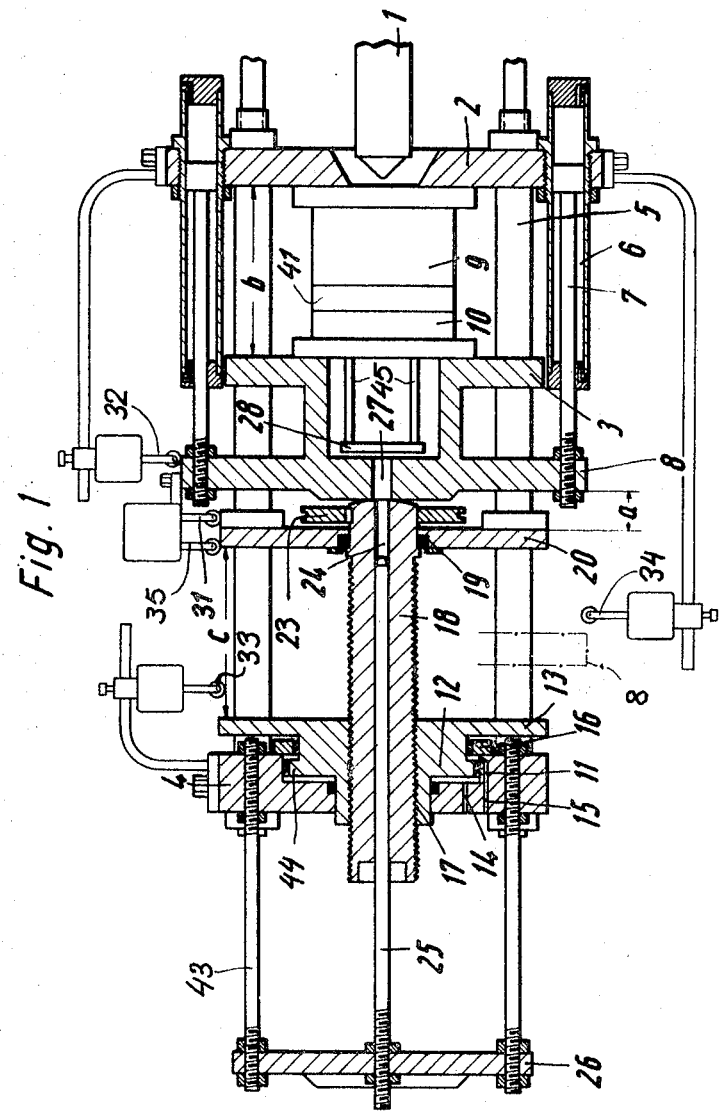
FIG. 1 is a partly diagrammatic axial sectional plan view of an injection-molding machine embodying my present invention.
Figure 2:
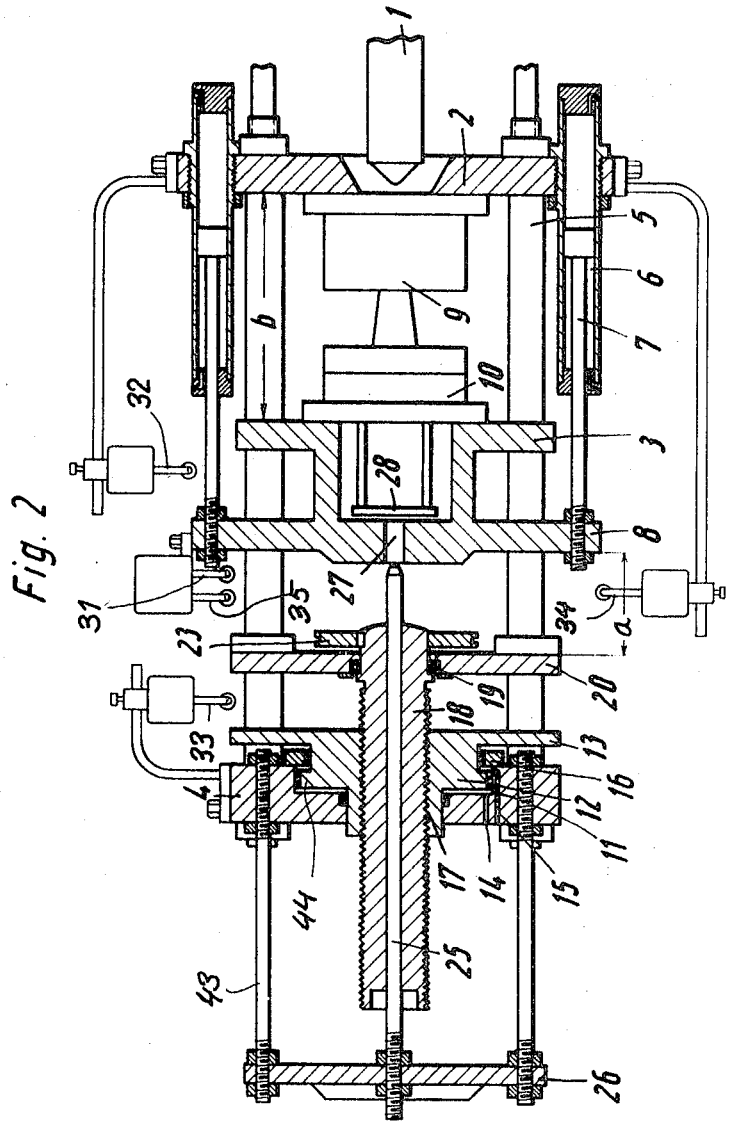
FIG. 2 is a view similar to FIG. 1, showing the mold in a partly open position.
Figure 3:
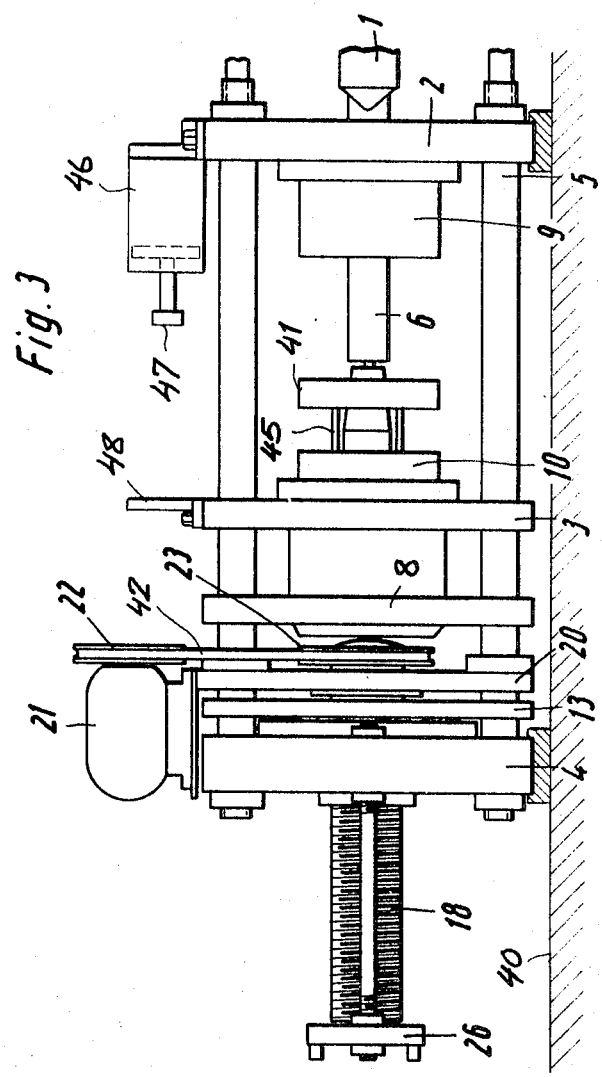
FIG. 3 is an axial sectional elevational view of the machine of FIGS. 1 and 2, showing the mold fully open.

The injection-molding machine shown in FIGS. 1—3 comprises an injection cylinder 1 axially movable within a central aperture of a mounting plate 2 which rises from the machine bed 40 (FIG. 3) to constitute a fixed support for a mold portion 9 having an injection orifice in line with the nozzle-shaped end of cylinder 1. A complementary second mold portion 10 is carried on a movable supporting member 3 which slides on a set of four tie bars 5 extending parallel to the mold axis. An intermediate mold portion 41 is slidably supported on mold portion 10 via pins 45 forming part of an ejection device 28. In the closed position of mold 9, 10, 41 (FIG. 1), cylinder 1 moves into contact with mold portion 9 to inject liquefied plastic material under pressure into the cavity or cavities of the mold as is well known per se.

Another plate 4 fixed to bed 40 acts as a second support for the tie bars 5 to the rear of movable member 3. Slidably supported on these tie bars, between members 3 and 4, is a plate-shaped holder 20 formed with a bearing 19 for a leadscrew 18 extending along the mold axis. Holder 20 carries an electric motor 21 which, via pulleys 22, 23 and a belt 42, reversibly rotates the screw 18 in a manner more fully described hereinafter. The screw is formed with a throughgoing axial bore 24 traversed by a rod 25 which is secured to an anchor plate 26 to the rear of plate 4, plate 6 being supported on plate 4 with the aid of threaded connecting bolts 43 enabling an adjustment of the relative distance of the two plates. Rod 25 is aligned with a bore 27 in mold support 3 to act upon the ejector 28 when the movable mold portion 10 is withdrawn into the open-mold position shown in FIG. 3.

Leadscrew 18 is engaged by the mating threads 17 of a nut 12 which is held against rotation by a flange 13 riding on the tie bar 5. The assembly 12, 18 constitutes an axially extensible brace adapted to span the gap between mold support 3 and plate 4, with the latter acting as a backstop member for that brace. Plate 4 has a recess 11, open toward the mold, which functions as a cylinder receiving a thrust piston 44 integral with nut 12. Two fluid channels 14 and 15 in plate 4 open into the cylinder 11 on opposite sides of piston 44, the admission of fluid to channel 14 serving to drive the piston forward (i.e. toward the mold) whereas the entry of fluid into channel 15 has the opposite effect. The axial displacement of piston 44 in cylinder 11 is limited by a cover plate 16, held onto the plate 4 by suitable means not shown, to a small fraction of the stroke length of movable mold support 3, e.g. to a few millimeters.

The reciprocation of mold support 3 on tie bars 5 is brought about by a pair of diametrically opposite fluid cylinders 6 rigid with stationary mold support 2 and associated pistons 7 which are anchored to a flange 8 of member 3. Pistons 7 are of the double-acting type for positive forward and rearward displacement by the preferably hydraulic operating fluid.

Certain distances $a$, $b$ and $c$ are important to the operation of the system shown in FIGS. 1—3, as more fully described hereinafter with reference to FIG. 7. Distance $a$ is the gap between movable mold-supporting plate 3 and holding plate 20; distance $b$ is a relative spacing of mold plates 2 and 3; and distance $c$ is measure between holder 20 and nut 12. Critical limits of these distances are sensed by three microsensitive switches 31, 32 and 33, respectively; switch 31 (which has two contact arms as shown in FIG. 7) is fixedly carried on movable mold support 3 whereas switches 32 and 33 are adjustably mounted on fixed mold support 2 and on backstop plate 4. Two other, similar switches 34 and 35 are also carried on mold supports 2 and 3, respectively, for detecting intermediate values of distances $b$ and $a$.

In FIG. 3 I have also illustrated a fluid-operable pusher, in the form of a cylinder 46 with a piston 47, designed to help separate the portions of the closed mold by acting upon an abutment 48 on mold support 3 upon completion of the molding operation.

In FIG. 7 I have shown some of the elements of FIGS. 1—3, including switches 31—35, motor 21, part of plate 4 with its inlets 14 and 15, pusher 46, 47 and one of the two cylinders 6 (the other one being connected in parallel therewith). FIG. 7 further shows a battery 50, representative of any convenient source of electric current, along with several relays 51, 52, 53, 54 and a number of solenoid-actuated slide valves 55, 56, 57 and 58 controlling the admission of hydraulic fluid to inlets 14 and 15 of thrust cylinder 11, to ports 61 and 62 of mold-closing cylinder 6 and to a port 63 of pusher cylinder 46.

In the fully retracted position of mold support 3, represented in FIG. 1 by the phantom-line showing of its flange 8, the hydraulic and electric circuits remain in the state illustrated in FIG. 7 until switch 59 is reversed from "back" to "forward." Sensing switches 31, 32 and 34 are open whereas switches 33 and 35 are closed. Via switch 59, valve 55 is maintained in its right-hand position in which high-pressure fluid enters the feed channel 15 of cylinder 11 to hold the piston 44 retracted, channel 14 being vented to the sump or low-pressure side of the hydraulic system. Valve 56 is held in its left-hand position to drain the left-hand port 61 of cylinder 6 while its companion valve 57, actuated by way of switch 35, occupies a corresponding position admitting high-pressure fluid to the right-hand port 62; thus, the pistons 7 are displaced into their extreme rearward position, relay 54 being operated in parallel l with the left-hand solenoid of valve 57 to control the valve 58 in a manner admitting fluid to the cylinder 46 so as to keep its piston 47 extended toward the left. Relay 52, which serves to reverse the screw-driving motor 21, is operated in parallel with the right-hand solenoid of valve 55 to connect the armature of that motor in a circuit for reverse rotation, i.e. rotation in a sense withdrawing the leadscrew from mold support 3; this operating circuit, however, is broken at the lower armature of relay 51 which is deenergized by the open switch 34.

When the switch 59 is moved into its forward position, valves 56 and 57 are shifted to the right while valve 58 is also moved into its alternate position. Hydraulic fluid thus enters the left-hand ports 61 of cylinder 6 while being drained from their right-hand ports 62, thereby moving the pistons 7 toward the right, while cylinder 46 is also vented so that its piston 47 can be repressed by the oncoming mold support 3. Shortly after the flange 8 has left its retracted position, it trips the switch 34 to energize the motor relay 51, this relay locking over its upper armature in series with one of the two contact arms of switch 31 and with switch 59. Since relay 52 releases immediately upon the reversal of switch 59, motor 21 is now energized in a forward sense to rotate the leadscrew 18 so that the latter follows the advancing mold support 3 without, however, overtaking same. As the mold closes (FIG. 1), protective switch 32 is closed by its engagement with flange 8 to indicate the absence of foreign matter or fragments from previous molding operations between the several mold portions 9, 10, 41 as is well known per se; the position of switch 32 with reference to the stationary mold support 2 has, of course, been selected in conformity with the axial depth of the mold. As the continuing advance of holder plate 20 narrows the gap $a$ to a distance which corresponds to a close approach of the front end of screw 18 to the arrested member 3, switch 31 detects the proximity of plate 20 and opens the holding circuit of relay 51 so that motor 21 is stopped; it will be noted that the lower armature of this relay short circuits the armature winding of the motor so that the latter is rapidly braked to standstill. The reversal of switch 31 was preceded by a tripping of switch 35 which, however, is of no effect at this time. With switch 32 properly closed, the second contact arm of switch 31 energizes the left-hand solenoid of valve 55 whereby high-pressure fluid enters the channel 14 (with simultaneous venting of channel 15) so that piston 44 is thrust forward together with screw 18 to bridge the small clearance between the end of that screw and the mold support 3 and to exert a high clamping pressure upon this mold support. In this position (FIG. 1) the mold is firmly held closed to permit the injection of plastic material into its interior from cylinder 1.

After the requisite length of time, during which the injection cylinder 1 is again separated from the mold, switch 59 is returned to the "back" position illustrated in FIG. 7 with resultant reenergization of relay 52 as well as of the right-hand solenoid of valve 55 and the left-hand solenoid of valve 56 in lieu of the previously energized opposite solenoids of these valves. The shifting of valve 55 to the right contracts the thrust assembly 4, 12 whereby the screw 18 breaks away from the still stationary mold support 3. At the same time, the leftward shift of valve 56 drains the cylinder 6 through its left-hand port 61 but does not yet result in an opening stroke of piston 7 since valve 57 is still in its right-hand position so that the opposite port 62 is also connected to low pressure. Shortly thereafter, the slow-operating relay 53 attracts its armature to reenergize the relay 51 whereby motor 21 turns the screw 18 in reverse to retract it further from mold support 3. The rate of this retraction is sufficient to prevent the screw 18 and the holder 20 from being overtaken by the mold support 3 during the subsequent mold-opening stroke. This stroke is initiated by the reclosure of switch 35 as the receding holder 20 trips that switch; shortly before, switch 31 had been restored to its illustrated normal position without any immediate effect since both contact arms of this switch are open-circuited at switch 59. The closure of switch 35 brings on the relay 34 which reverses the valve 58 so that high-pressure fluid enters the cylinder 46 to help open the mold. With the stroke of the piston 47 of this cylinder constituting only a small fraction of the mold-opening stroke, the task of returning the mold support 3 to its retracted position is taken over by the cylinders 6 as the energization of the left-hand solenoid of valve 57 (in parallel with relay 54) reapplies high fluid pressure to the right-hand ports 62 of these cylinders. The subsequent momentary closure of switch 34 is without effect yet the opening of switch 33 by the holder 20, arriving in its terminal position, releases the relay 51 to stop the motor 21. The position of switch 34 is, of course, so adjusted that the maximum distance $c$ as measured by the switch corresponds to the desired separation of mold supports 3 in the open position, this separation depending on the axial dimensions of the several mold portions. Rod 25, suitably adjusted on its anchor plate 26 in accordance with the length of the mold-opening stroke, ejects the molded article or articles from the interior of the mold as its two movable portions 10 and 41 are split apart. A new molding cycle can now begin.

Figure 4:
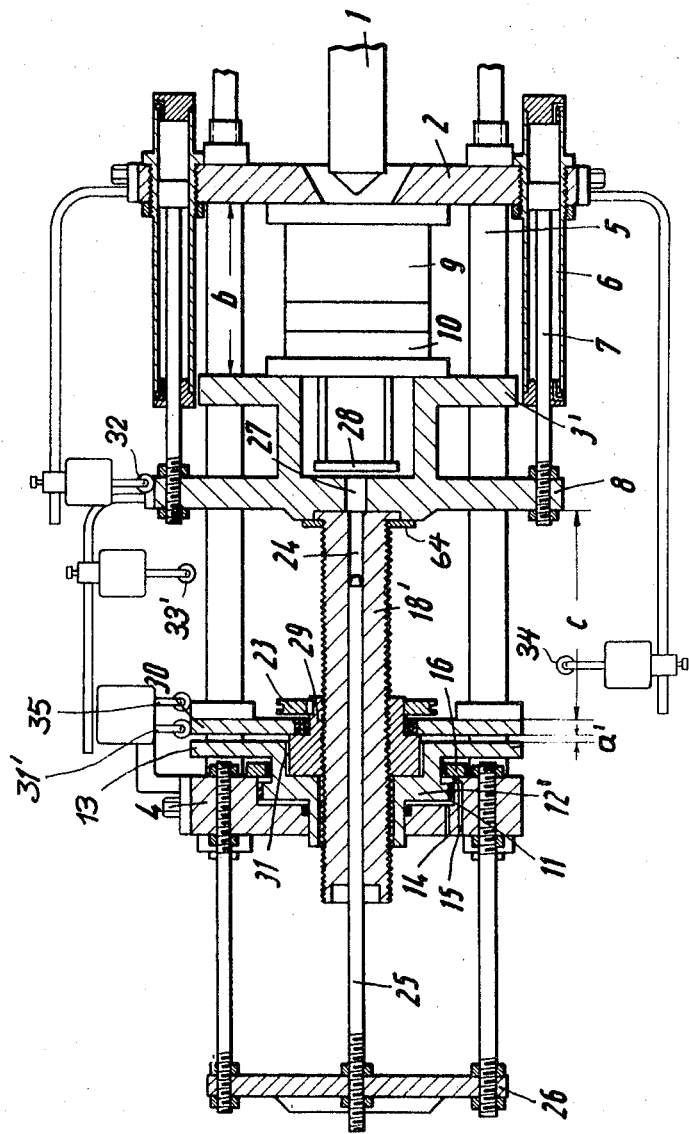
Figure 5:
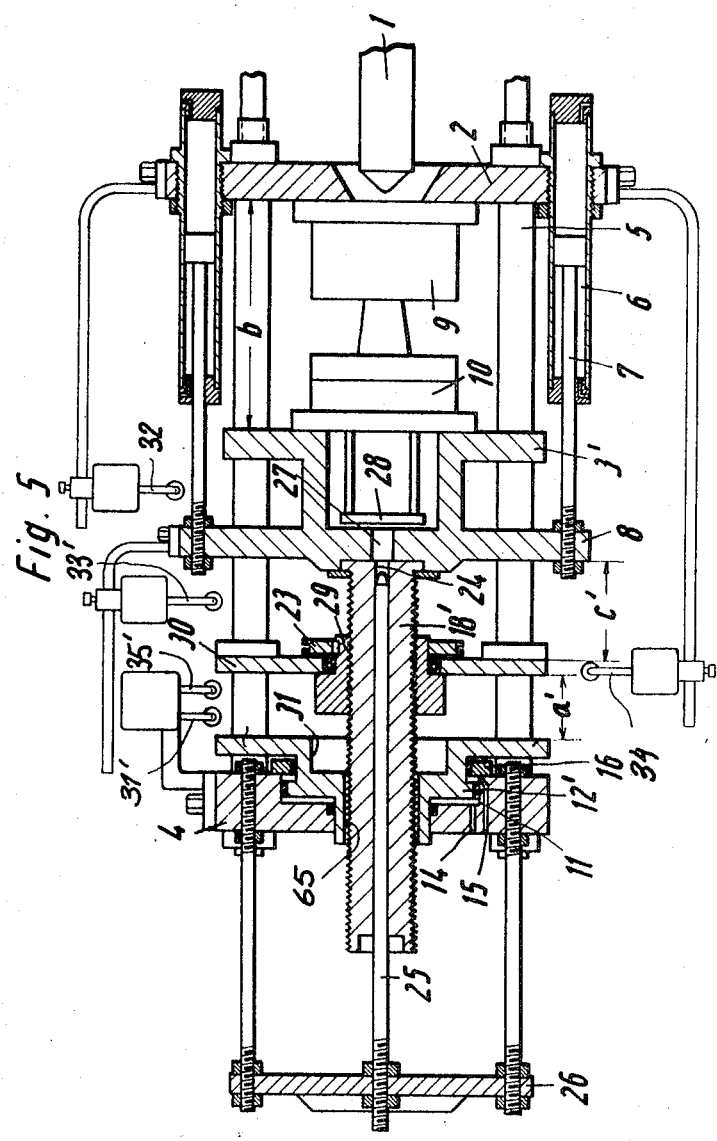

In FIGS. 4—6 I have shown a basically similar system wherein, however, the mobile support for motor 21 has been designed as a modified holder plate 30 in which a nut 29, operatively coupled with the motor via belt transmission 22, 23, 42 is rotatably journaled while engaging a slightly modified leadscrew 18'. The latter is fixedly secured to the correspondingly modified mold support 3' which has a rearwardly facing recess wherein the head of screw 18' is held by a retaining plate 64 suitably secured to that mold support. Backstop plate 4 cooperates with a modified thrust piston 12' which differs from piston 12 by having an unthreaded central bore 65 freely penetrated by screw 18'; this piston, moreover, is formed with a forwardly open recess 31 to accommodate the nut 29 in the extreme left-hand position of holder 30 (FIG. 4) in which the brace 18', 29 effectively spans the gap between members 3' and 4. The distance $a'$, which indicates the approach of the rotatable brace element (here the nut 29) to one of the two members (here the plate 4) bracketing the holder 30, is therefore measured between that holder and the thrust piston 12' or, more precisely, the plate 4 with which that piston is normally in contact. To this end, switches 31' and 35' are fixedly mounted on plate 4 for tripping by the holder 30 as it moves to the left upon closure of the mold. Conversely, a switch 33' is adjustably mounted on movable mold support 3' to measure the distance $c'$ between that mold support and holder 30 in the terminal position of the latter when the mold is open. Switches 32 and 34 have the same function as in the preceding embodiment.

Aside from these modifications, the operation of the system of FIGS. 4—6 is analogous to that described in conjunction with FIG. 7 for the embodiment of FIGS. 1—3 and need not be explained in further detail.

I claim:
1. A mold-closing apparatus for a molding machine having a split mold with axially separable portions, comprising:
a fixed first mold support carrying one of said portions;
elongated guide means extending in the direction of the mold axis;
a fixed backstop member remote from said first mold support;
a movable member forming a second mold support axially slidable on said guide means between said backstop member and said mold support while carrying another of said portions;
fluid-operable drive means anchored to said mold supports for relatively reciprocating same to close and to open the mold;
axially extensible bracing means interposed between said members;
motor means independent of said drive means but operable substantially concurrently therewith for extending and contracting said bracing means in step with the closing and the opening of said mold, respectively, to span the gap separating said members in a position of mold closure;
and fluid-actuatable thrust means inserted between said members in series with said bracing means for imparting additional axial pressure to said movable member in said position of mold closure.

2. An apparatus as defined in claim 1 wherein said bracing means comprises two relatively rotatable threadedly interconnected elements, one of said elements being slidably but nonrotatably mounted on said guide means, said motor means being coupled with the other of said elements for reversibly rotating same.

3. An apparatus as defined in claim 2 wherein said one of said elements is mounted on one of said members, further comprising a holder slidable between said members on said guide means, said other of said elements being rotatably journaled in but axially fixed with reference to said holder.

4. An apparatus as defined in claim 3 wherein said motor means is carried on said holder.

5. An apparatus as defined in claim 3, further comprising switch means responsive to the distance between said holder and the other of said members for deactivating said motor means upon said other of said elements approaching said other of said members to within a small fraction of the stroke length of said movable member.

6. An apparatus as defined in claim 5 wherein said thrust means is responsive to said switch means for generating said additional axial pressure upon deactivation of said motor means.

7. An apparatus as defined in claim 6, further comprising circuit breaker means in series with said switch means and responsive to the distance between said mold supports for inhibiting actuation of said thrust means prior to complete mold closure.

8. An apparatus as defined in claim 1 wherein said backstop member is provided with a fluid chamber, said thrust means including a piston axially slidable in said chamber and conduit means for alternately admitting a working fluid to said chamber on opposite sides of said piston, the latter being operatively coupled with said bracing means.

9. An apparatus as defined in claim 8 wherein said bracing means comprises an axially extending screw rotatable by said motor means and a nut on said screw integral with said piston.

10. An apparatus as defined in claim 8 wherein said bracing means comprises an axially extending screw rigid with said movable member and a nut on said screw rotatable by said motor means, said nut confronting said piston for engagement thereby upon the admission of said working fluid to the side of said piston remote from said movable member.

11. An apparatus as defined in claim 1 wherein said drive means is provided with start means operable by said drive means during the mold-closing stroke for initiating the extension of said bracing means.

12. An apparatus as defined in claim 11, further comprising contact means responsive to a predetermined contraction of said bracing means upon reverse operation of said motor means for reoperating said drive means to open the mold with substantially concurrent deactivation of said motor means.

13. An apparatus as defined in claim 12, further comprising switch means responsive to an approach of said bracing means to within a predetermined minimal distance from one of said members for disabling said drive means during the mold-opening stroke and for arresting said motor means and actuating said thrust means in the position of mold closure.

14. An apparatus as defined in claim 1 wherein said drive means comprises piston-and-cylinder means interconnecting said mold supports, one of said mold supports being provided with fluid-responsive pusher means operable in the position of mold closure to separate said portions by a fraction of the stroke length of said movable member upon incipient contraction of said bracing means.